Nov. 6, 1962            A. E. WADHAM            3,061,888
METHOD OF MANUFACTURING A REINFORCED PLASTIC ARTICLE
Filed Dec. 28, 1959
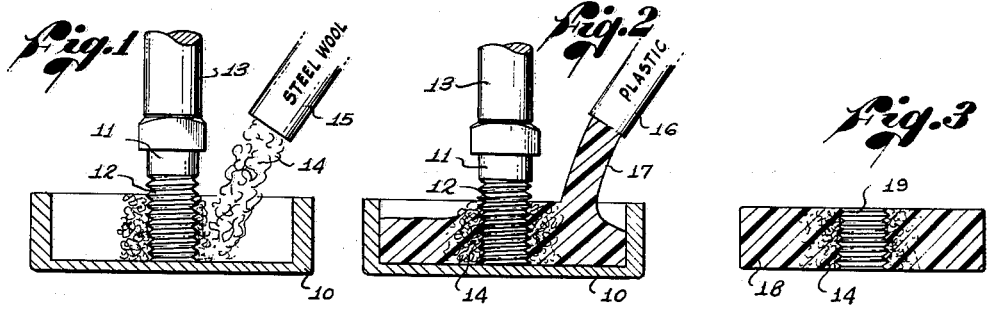
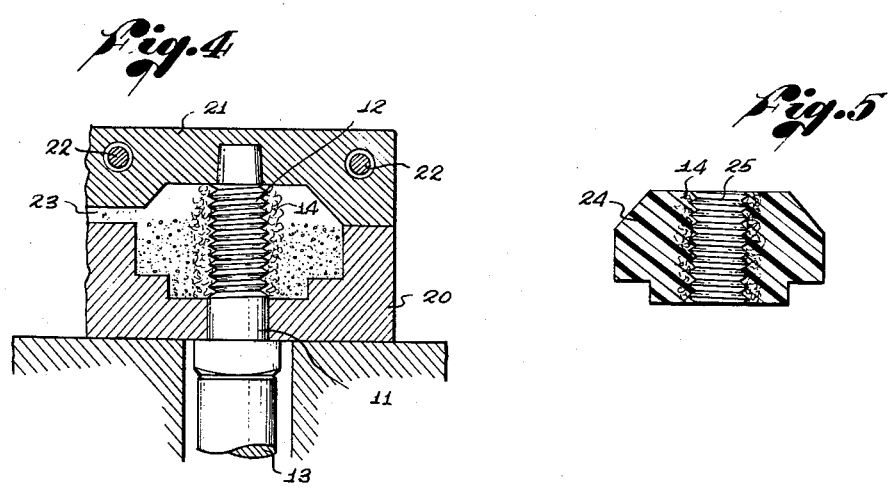
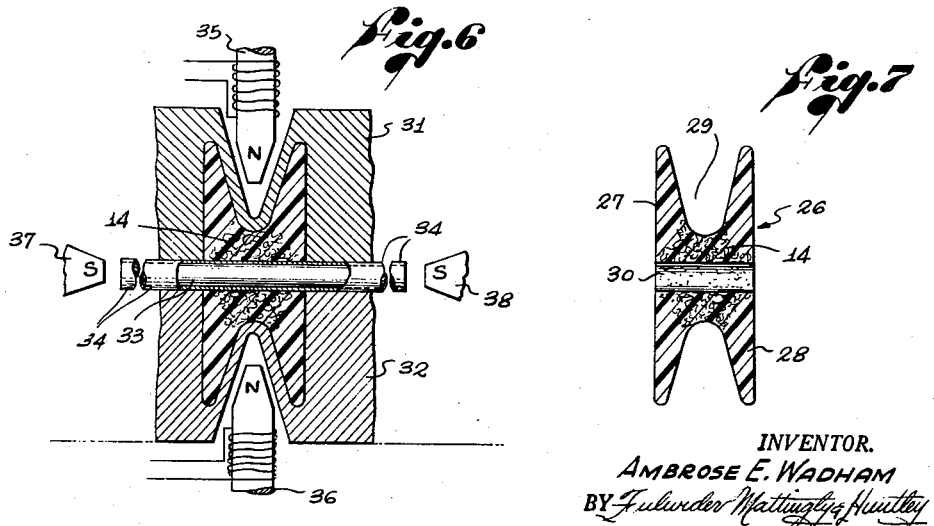
INVENTOR.
AMBROSE E. WADHAM
BY Fulwider Mattingly & Huntley
Attorneys United States Patent Office 3,061,888
Patented Nov. 6, 1962

3,061,888
METHOD OF MANUFACTURING A REINFORCED PLASTIC ARTICLE
Ambrose E. Wadham, 1036 Shasta Place, El Monte, Calif.
Filed Dec. 28, 1959, Ser. No. 862,372
8 Claims. (Cl. 18—59)

This invention relates to a reinforced plastic article and to a method of manufacturing such an article. More particularly, this invention relates to a method of forming reinforced and hardened bearing surfaces, screw threaded or gear portions, or the like in articles made of organic plastic material during the molding operation.

In recent years, organic plastic materials usually of a synthetic resinous type have found increasingly widespread application. Small parts, wheels, pulleys, toys, and innumerable other objects in industry and commerce are presently molded from such plastics.

For a definition of what is meant by an organic plastic material, reference is made, for example, to a book entitled "Van Nostrand's Scientific Encyclopedia" published by D. Van Nostrand Company, Inc., New York, N.Y., Third edition, January 1958. At page 1268 et seq. it is pointed out that such plastics generally comprise mixtures of material including a binder of a resinous substance or a cellulose derivative as the principal ingredient in a mixture with other ingredients, such as a filler, solvent, plasticizer, lubricant, accelerator, dye, etc. Such plastic mixtures are characterized by being capable of being shaped into a form or cast in a mold at one stage of processing and subsequently becoming a relatively rigid product at another stage. The synthetic resins used in plastics and thus the plastics themselves are placed into two general classes: (1) the thermosets or thermosetting plastics and (2) the thermoplastics. The former are characterized by becoming hard and infusable after being subjected to heat and pressure. The latter are characterized by having the property of softening under heat and pressure and being capable of resoftening. The tensile strength, flexural strength, hardness, shock resistance, and other physical properties of various typical plastics are listed at page 1272 of the above noted volume.

In many applications, it would be desirable to impart some of the physical characteristics and properties of steel or other metals to one or more portions of articles molded from such plastics. Thus, where it is desired to mold threads into a plastic member which is to receive and support a metal bolt, it has been found that the actual thread protrusions are necessarily subject to greater strain than the rest of the plastic hub or wheel member and tend to break very easily. Similar considerations apply to any bearing surface, to gear teeth, reduced portions, or the like.

Furthermore, in many instances it may be desirable to impart some of the electrical and/or magnetic properties of various metals, such as steel, to molded plastic articles. Thus, plastic articles are not normally magnetizable. In many applications, however, it would be desirable to have a plastic article which could be secured in position by or otherwise be responsive to a magnetic field.

It is, therefore, an object of this invention to provide a method of manufacturing a molded plastic article which imparts physical properties characteristic of the metals to the plastic article.

It is still another object of this invention to provide a method of forming hardened bearing or screw threaded portions in a plastic article during the molding thereof.

It is yet another object of this invention to provide a method of molding a metal reinforced organic plastic article.

Briefly, in accordance with one aspect of the invention, a hardened or reinforced surface is provided in a molded plastic article by magnetizing a metallic member, such as a bolt, having a shape complementary to the shape of the surface of the article, such as the threads of a hole to receive the bolt, placing a plurality of pieces of magnetizable metal, such as steelwool, iron filings, or the like forming a pliable mass adjacent to the magnetized member to be held in place thereby, and then molding the plastic article against the magnetized member so as to imbed the pliable mass of metal in the plastic. Thereafter, when the bolt or other magnetized member in removed from the molded plastic article, there will remain the threaded or other surface which is hardened and reinforced by the imbedded pieces of metal.

Other objects, features, and advantages of the present invention will be more fully apparent to those skilled in the art from the following detailed description taken in connection with the accompanying drawing in which like reference characters refer to like parts throughout and wherein:

FIGURE 1 is a sectional view of apparatus used in the first step of molding a threaded hole in a plastic disk or wheel.

FIGURE 2 is a view similar to FIGURE 1, but illustrating the second step in the process.

FIGURE 3 is a sectional view of the finished article showing a plastic disk or wheel having a hole molded therein with reinforced threads thereon.

FIGURE 4 is a sectional view illustrating the use of a molding die for injection molding of a plastic nut or hub cap having reinforced threads therein.

FIGURE 5 is a sectional view of the finished article formed in the die shown in FIGURE 4.

FIGURE 6 is a sectional view of injection molding apparatus for forming a reinforced pulley wheel.

FIGURE 7 is a sectional view of the pulley wheel made in the apparatus shown in FIGURE 6.

Coming now to the drawing, there is shown in FIGURE 1 a mold 10 which is generally cylindrical in shape and is open at the top end as shown. The mold 10 may be made of any convenient material, such as steel or other metals to which plastics do not readily adhere. It will, of course, be understood that the mold 10 may take any desired shape and that the cylindrical shape suitable for molding a wheel or disk structure is presented by way of example only.

A bolt 11 having a threaded shank portion 12 is uprightly positioned at the center of the mold 10.

A permanent magnet 13 is placed in contact with the top of the bolt 11 to thereby magnetize the bolt. Alternatively, bolt 11 could be magnetized by electro-magnetic induction as by the use of a solenoid.

Steelwool 14 is then poured from a container 15 into the mold 10. The steelwool is, of course, attracted by the magnetized bolt 11 and will be held in position around the bolt 11 by the magnetic field thereof. Preferably, the steelwool is evenly distributed around all sides of the bolt either by moving the container 15 or by manually repositioning the steelwool 14.

It will be understood that the steelwool 14 is merely one example of a possible type of metal reinforcing means. More generally, what is desired is to have a plurality of pieces of metal which together form a pliable reinforcing mass which may be disposed in the area desired to be reinforced. Each individual piece of metal, of course, acts separately to give a rigid reinforcing effect. Although steelwool is illustrated in the drawing, it will be understood that I can also use powdered metals, grindings, iron filings, steel shot, steel balls, and the like.

When the reinforcing metal, such as the steelwool 14 has been distributed around the bolt 11 or other die member, as shown in FIGURE 1, the plastic material is poured into the mold, as shown in FIGURE 2. One suitable plastic, for example, is a cold flow thermo-plastic, such as methyl methacrylate, which is commercially available under the trade names "Plexiglas" or "Lucite." Such a plastic material 17 may be poured from any convenient container 16 to fill the mold 10. As the plastic is poured into mold 10, the reinforcing pieces of metal 14 are embedded in the plastic 17.

Inasmuch as the reinforcing metal 14 has been magnetically held in position adjacent the bolt 11, these pieces will remain in the finished plastic disk 18 in a position adjacent to the threaded surface 19 of the aperture formed in disk 18 by the bolt 11. The reinforcing steelwool 14 is thus integrally cast or embedded into the threaded surface 19 and acts to reinforce or strengthen the particular portion of the threaded disk or wheel which receives the greatest bearing load.

In practice, it has been found that a threaded aperture formed in accordance with the above teaching is extremely durable and that the bolt 11 may be screwed into and out of the aperture 19 an indefinitely large number of times without appreciable wear on or breakage of the threads. More particularly, it has been found that a threaded bearing surface formed in accordance with the reinforcing method taught above, will provide substantially greater durability and substantially better wearing characteristics than has hitherto been available.

Of course, it will be understood that the particular type of plastic material used is not critical and that any plastic material suitable for a given application can readily be used. One can, for example, use the same reinforcing method in molding synthetic or natural rubber products. Furthermore, the particular type of molding technique used can also be varied to suit the needs of a given application.

In FIGURE 4, for example, there is shown injection molding apparatus which is also suitable for use in the present invention. It will be noted that the plug or bolt 11 which is to form the bearing or screw threaded hole in the molded article, is again magnetized by a permanent magnet 13. The bolt is inserted in the desired position in the molding die. The bolt may, for example, extend through an aperture in the lower half 20 of the die and be seated in a recess in the upper half 21 of the die. The die is provided with conventional heating rods 22 and with an injection passage 23 through which molten plastic is injected.

The steelwool or other reinforcing metal 14 is positioned around the threaded shank 12 of bolt 11 before the upper portion 21 of the die is placed on the lower portion 20 to close the mold. The magnetic field around the bolt 11 holds the reinforcing metal pieces 14 in the desired position.

The plastic material is then injected through passage 23 to completely fill the mold cavity. Thereafter, the molding process is completed in the usual manner to form the threaded cap or nut 24, shown in FIGURE 5. The reinforcing metal 14 is distributed around the threaded aperture 25 formed in the center of the nut 24 so as to harden and reinforce this threaded surface.

The provision of a plurality of pieces of reinforcing metal is desirable not only in reinforcing and hardening threaded or bearing surfaces, but also in reinforcing reduced portions of an article, particularly where such reduced portions may be load bearing or subjected to more strain than the rest of the article. Consider, for example, the pulley wheel 26, shown in FIGURE 7, which is manufactured by the apparatus shown in FIGURE 6. The pulley wheel 26 is provided with lateral flanges 27 and 28 which angularly surround a central peripheral recess 29 in which a wire, cord, rope or the like is adapted to ride. The pulley wheel 26 is further provided with a central aperture 30 through which a shaft may extend to rotatably support the pulley. Reinforcing steelwool or other pieces of metal are distributed adjacent the surface of the bore 30 centrally of the pulley and desirably extend up to the surface of the circumferential recess 29 to additionally afford a hardening and reinforcing action against the weight of the rope on the pulley wheel.

The desired distribution of the reinforcing pieces of metal, shown in FIGURE 7, can be achieved in molding by the process illustrated in FIGURE 6. By way of illustration, a compression molding technique is illustrated in which an upper die 31 is forced against a lower die 32 after the mold has been filled with a plastic powder.

A metal rod 33 extends centrally through the die members 31 and 32 to define the central aperture 30. The metal rod 33 is preferably provided with a coat of paraffin 34 to faciiltate removal of the rod from the molded pulley wheel and also to permit ready control of the desired clearance between the molded pulley wheel and its central shaft. That is to say, if it is desired to mold a pulley wheel having a clearance of $\frac{1}{10}''$ for a rod of a given size, that particular rod may be used in the molding operation and may be provided with a coating of paraffin which is the desired $\frac{1}{10}''$ in thickness.

The distribution of the reinforcing metal 14 within the mold before application of heat and compression thereto, is preferably controlled by two or more opposed electromagnets 35 and 36 each of which projects into the groove in the pulley mold. Each of the electro-magnets 35 and 36 is positioned so that its north seeking pole, for example, is adjacent the mold. The central rod 33 is then magnetized by a pair of south seeking poles 37 and 38 of either permanent or electro-magnets. The magnetic lines of force will, of course, flow from north to south seeking poles and will, in general, determine the distribution of the steelwool, iron fillings, or the like. It will be seen that the configuration, shown in FIGURE 6, will produce substantially the distribution of the particles 14 which is desired to reinforce both the lower portion of the groove 29 and the entire circumferential surface of the bore 30.

Having thus supplied the mold with raw plastic and having positioned the reinforcing metal pieces or particles therein, and secured these pieces in position by the magnetic arrangement shown, heat and pressure can be applied to the mold in a conventional manner. When the plastic has been set, the source of magnetization is removed, the paraffin coated rod 33 is withdrawn from the central bore 30, and the other members of the die are then removed. The finished product is the pulley wheel 26, shown in FIGURE 7, which has reinforcing metal pieces positioned around the central bore 30 and in the reduced portion or area between the central bore 30 and the pulley groove 29.

While a particular exemplary preferred embodiment of the invention has been described in detail above, it will be understood that modifications and variations therein may be effected without departing from the true spirit and scope of the present invention as defined by the following claims.

I claim:

1. A process for making a reinforcing portion in a molded product comprising: providing a molding member having exposed shape characteristics for forming said portion; depositing particles of a reinforcing material adjacent said molding member; drawing said particles toward said member by electrical forces to form a permeable mass of said particles adjacent said member and having a discontinuous boundary conforming thereto; allowing liquid casting material to permeate said mass and discontinuities of said boundary; and thereafter allowing said casting material to solidify and form a composite of said casting and reinforcing material adjacent and having a continuous boundary conforming to said molding member.

2. A process as in claim 1 wherein said reinforcing material comprises finely divided metal particles.

3. A process as in claim 1 wherein said electrical forces comprise a magnetic flux.

4. A process as in claim 1 wherein said reinforcing material comprises strands of metallic thread.

5. A process as in claim 2 wherein said casting material comprises an organic plastic.

6. A process for making a strengthened surface on a molded product comprising: providing a molding member having exposed shape characteristics complementary to said surface; depositing finely divided particles of a metallic material adjacent said molding member; drawing said particles toward said member by magnetic forces to form a permeable mass of said particles adjacent said member and having a discontinuous boundary conforming thereto; allowing liquid organic plastic casting material to permeate said mass and discontinuities of said boundary; and thereafter allowing said casting material to solidify and form a composite of said casting material and said particles adjacent and having a continuous boundary conforming to said molding member.

7. In a molding operation, a process wherein particles of a material are drawn together by an electrical field to form a permeable mass in a mold, said mass then being held in a predetermined position by said field in said mold, while a liquid casting material is allowed to permeate said mass and then allowed to solidify to bind said mass together.

8. In a molding operation, a process wherein particles of a material are drawn together by an electrical field to form a permeable mass having a boundary adjacent a portion of the mold, the density-shape pattern of the lines of force in said electrical field differing from the field pattern which would be generated in said mold were said mold portion a pole member of said field.

References Cited in the file of this patent

UNITED STATES PATENTS

| | | |
|---|---|---|
| 1,599,924 | Sanborn | Sept. 14, 1926 |
| 1,930,788 | Buckner | Oct. 17, 1933 |
| 2,297,923 | Strong et al. | Oct. 6, 1942 |
| 2,305,612 | Glidden | Dec. 22, 1942 |
| 2,480,966 | Richardson et al. | Sept. 6, 1949 |
| 2,594,459 | Larson | Apr. 29, 1952 |
| 2,672,070 | Forster | Mar. 16, 1954 |
| 2,684,503 | Silver | July 27, 1954 |
| 2,775,281 | Smith | Dec. 25, 1956 |

FOREIGN PATENTS

| | | |
|---|---|---|
| 412,537 | Great Britain | Sept. 23, 1932 |
| 556,396 | Great Britain | Oct. 4, 1943 |

UNITED STATES PATENT OFFICE
CERTIFICATE OF CORRECTION

Patent No. 3,061,888

November 6, 1962

Ambrose E. Wadham

It is hereby certified that error appears in the above numbered patent requiring correction and that the said Letters Patent should read as corrected below.

Column 4, line 59, for "reinforcing" read -- reinforced --

Signed and sealed this 14th day of May 1963.

(SEAL)
Attest:

ERNEST W. SWIDER
Attesting Officer

DAVID L. LADD
Commissioner of Patents